Patented Apr. 30, 1935

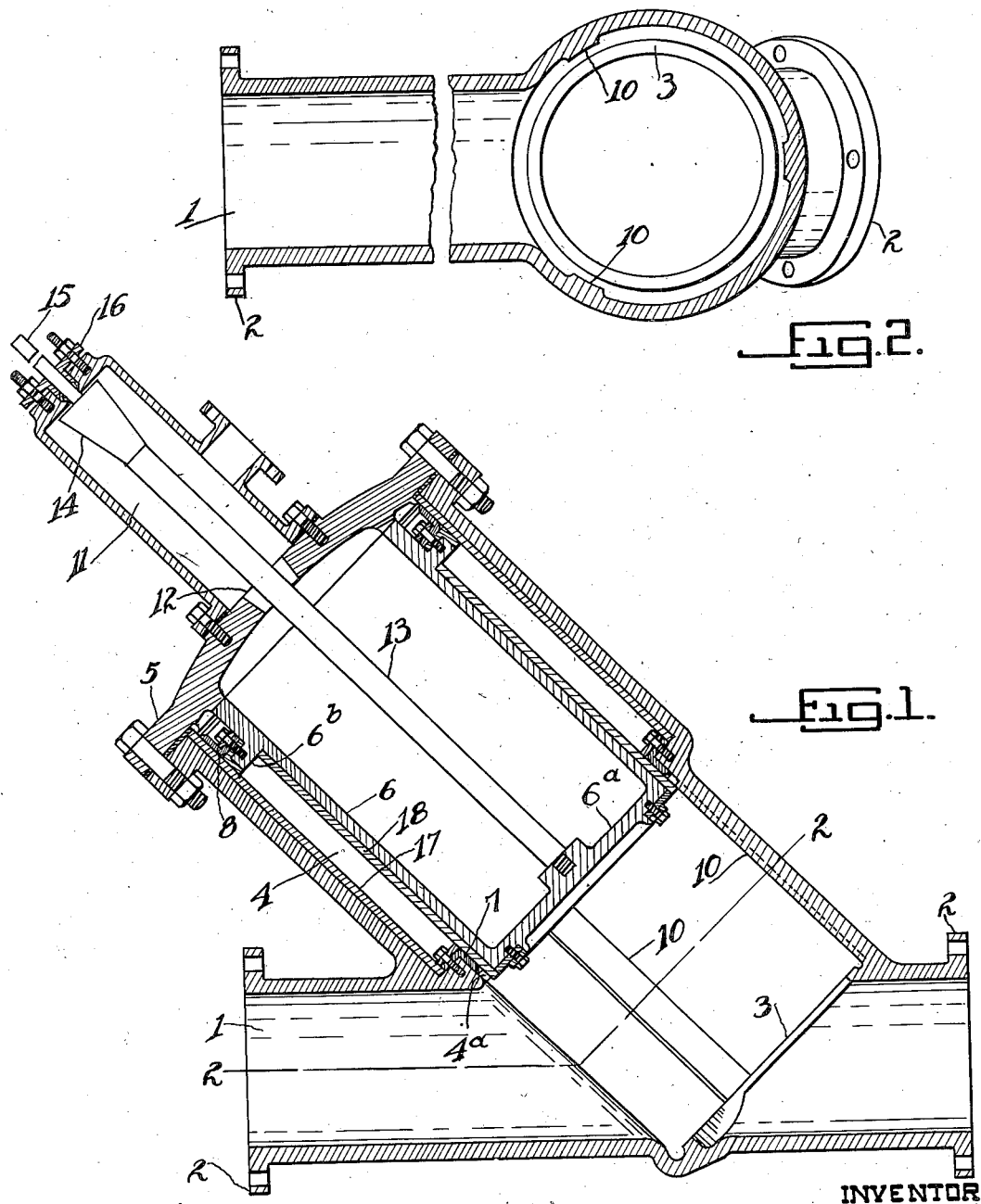

1,999,493

UNITED STATES PATENT OFFICE 1,999,493

HYDRAULIC VALVE

Charles Frederick White, Toronto, Ontario, Canada

Application November 23, 1933, Serial No. 699,415

2 Claims. (Cl. 137—153)

This invention relates to valves for controlling the flow of fluids through mains, and particularly to valves adapted for either automatic or manual control in which the moving part is a hydraulically operated piston, and my object is to devise a valve of this type which, when open, will permit of an entirely unobstructed straight line flow and in which the movement of the piston in closing off the flow is automatically slowed down as it comes to its seat to prevent jar.

I attain my object by a construction which may be briefly described as follows.

The valve body is formed with a straight flow, unobstructed waterway which will be at all parts of its length of substantially at least the same cross sectional area as the main in which it is to be connected. Intersecting the waterway at substantially an angle of forty-five degrees is a cylindrical valve chamber having its bore of two different diameters, the bore of lesser diameter being adjacent the waterway. In this chamber is mounted a differential piston, the lower end of which is adapted to seat on a valve seat in the waterway and inclined to the axis thereof, the seat being arranged to leave the bore of the waterway substantially entirely unobstructed. The valve is operable by the pressure of water led from the main to the valve chamber behind the piston or obtained from any other source of fluid pressure.

The control of the rate of closing is by means of a stem secured to the piston and passing through the passageway through which water passes into the valve chamber. This stem more or less obstructs the passageway and its head is coned so that the obstruction of the passageway is progressively increased as the piston nears the closed position, thus preventing shock in closing.

The invention is hereinafter more specifically described and is illustrated in the accompanying drawing in which Fig. 1 is a longitudinal section of the valve; and Fig. 2 is a section on the line 2—2 in Fig. 1.

In the drawing like numerals of reference indicate corresponding parts in the different figures.

Referring to the drawing, 1 is a waterway, preferably cylindrical in cross section, and provided with the flanges 2 whereby it may be connected in a water main. Formed in the wall of this waterway is the annular valve seat 3, which is inclined at an angle to the axis of the waterway so that its diameter is materially greater than that of the waterway itself. This valve seat, it will be seen is so formed that a straight unobstructed flow of fluid through the waterway is possible, the valve seat affording no obstruction whatever to the flow. The angle chosen is preferably an angle of 45° since a lesser angle is not readily practicable and a greater angle involves too great a diameter of valve seat if the waterway is to remain unrestricted.

4 is a cylindrical valve chamber which intersects the waterway and has its axis in axial alinement with the axis of the valve seat. This valve chamber is closed at its outer end by the cover 5. This valve chamber 4, it will be noted, is formed with the inner part 4ᵃ of lesser diameter than the outer part, the diameter of the part of lesser diameter being such as to accommodate a piston 6 adapted to seat upon the valve seat 3 and close the passage therethrough. This piston is formed with the closed end 6ᵃ. Its outer end is formed with an enlargement fitting the larger bore of the cylindrical valve chamber. The part 4ᵃ of the cylinder is provided with the washer 7 of known type fitting closely against the piston wall while the upper end of the piston is provided with the washer 8 of similar type fitting closely against the inner bore of the larger part of the cylinder. Preferably the larger bore of the valve chamber is provided with the lines 17 of brass and a similar liner 18 is fitted to the exterior of the piston 6. A differential piston is thus provided with the result that if the same fluid pressure exists in both the waterway and the chamber 4 the piston will move to its seat.

The means for applying fluid pressure to the interior of the valve chamber, however, forms no part of the present invention and no means with this object in view are shown or described.

The fluid inlet to the valve chamber is, however, shown as formed by the inlet chamber 11 which is secured to the cover 5 of the valve chamber. This inlet chamber is formed with an inlet opening in one side and communicates with the interior of the valve chamber through the opening 12 which is preferably formed in the cover 5.

13 is a timing device for regulating the speed of closing and comprises a stem secured to the head of the piston, which stem is of such length that it will project through the opening 12. This stem is provided with the inverted cone-shaped head 14, which, it will be noted, is adapted to substantially close the opening 12 when the piston is in contact with the valve seat 3. Thus, while the stem restricts flow through the opening 12, a progressive decrease in the size of the passageway takes place just as the piston nears the seat 3. A speedy closure without shock is thus provided for when suitable fluid pressure is admitted to the inlet chamber 11 by synchronizing with the stopping of the centrifugal pump which usually supplies the pressure.

To serve as an indicator of the position of the piston valve a rod 15 is secured to the head 14 of the stem 13 and this rod extends out through a stuffing box 16 provided in the outer end of the inlet chamber 11.

To form wearing surfaces for the piston as it moves to and from the seat I preferably form the ribs 18 on the portion of the valve chamber which intersects the waterway 1.

The advantages of the above described construction are numerous. There is no obstruction whatever to the flow of fluid through the waterway nor is there any change of direction of flow to create eddies and consequent friction. There is therefore no loss of head in the fluid passing through the valve when the latter is entirely open. The attainment of this result is largely due to the angle of inclination adopted for the valve seat and valve chamber which enables me to obtain a clear waterway without the use of an objectionably large valve chamber and piston. The valve also lends itself perfectly to automatic or manual control and is therefore adapted to a wide range of uses, such as for a stop valve, check valve, pressure reducing valve or altitude control valve.

What I claim as my invention is:

1. A valve operable by fluid pressure comprising a cylindrical straight flow unobstructed waterway having an annular valve seat formed on its wall inclined to the axis of the waterway and having its centre substantially in said axis; a cylindrical valve chamber intersecting the waterway in axial alinement with the valve seat and closed at its outer end; a piston valve movable in the said chamber to and from the seat, the valve chamber being of a length sufficient to permit of the substantially complete withdrawal of the valve from the waterway, the end of the valve chamber adjacent the waterway being of less diameter than the remainder of the valve chamber and the piston correspondingly shaped; and a stem secured to and projecting from the valve to move therewith and having its outer end formed as an inverted cone, the closed end of the valve chamber being provided with an inlet for fluid to operate the valve and through which the said stem passes, its coned end being adapted to progressively restrict the passage as the valve closes.

2. A valve operable by fluid pressure and comprising a waterway having an annular valve seat formed on its wall, inclined to the axis of the waterway and having its center substantially in said axis; a cylindrical valve chamber intersecting the waterway in axial alinement with the valve seat and closed at its outer end, the end of the valve chamber adjacent the waterway being of less diameter than the remainder of the valve chamber; a correspondingly shaped piston valve movable in the said chamber to and from said seat; a stem secured to and projecting from the valve having its outer end formed as an inverted cone; an inlet chamber on the closed end of the valve chamber, the said chambers having an opening forming a communication between them and forming an inlet for fluid to operate the valve, the coned end of said stem being adapted to progressively restrict the opening as the valve closes.

CHARLES FK. WHITE.